(12) United States Patent
Shrestha

(10) Patent No.: US 10,701,900 B1
(45) Date of Patent: Jul. 7, 2020

(54) PET CHEW DISPENSING DEVICE

(71) Applicant: HIMALAYAN CORPORATION, Mukilteo, WA (US)

(72) Inventor: Suman K. Shrestha, Marysville, WA (US)

(73) Assignee: HIMALAYAN CORPORATION, Mukilteo, WA (US)

( * ) Notice: Subject to any disclaimer, the term of this patent is extended or adjusted under 35 U.S.C. 154(b) by 148 days.

(21) Appl. No.: 15/973,170

(22) Filed: May 7, 2018

Related U.S. Application Data

(63) Continuation-in-part of application No. 15/882,667, filed on Jan. 29, 2018.

(60) Provisional application No. 62/537,626, filed on Jul. 27, 2017.

(51) Int. Cl.
*A01K 15/02* (2006.01)

(52) U.S. Cl.
CPC .................. *A01K 15/026* (2013.01)

(58) Field of Classification Search
CPC .... A01K 15/026; A01K 15/025; A01K 5/015; A01K 5/00; Y10T 292/20; Y10T 292/218; Y10T 292/221; Y10T 292/237; Y10T 292/302; Y10T 292/376; Y10T 292/45; Y10T 292/47; Y10T 292/858; E05B 3/04; F16B 7/10; F16B 7/105; F16B 7/1418; F16B 7/1472
USPC ............. 119/709, 707; D30/160; 292/55, 90, 292/115, 256.67, 256.71, 276, 289
See application file for complete search history.

(56) References Cited

U.S. PATENT DOCUMENTS

| | | | | |
|---|---|---|---|---|
| 221,466 A | * | 11/1879 | Klein | F16D 1/0847 403/362 |
| 780,850 A | * | 1/1905 | Williams | F16D 1/0847 403/362 |
| 846,088 A | * | 3/1907 | Brinley | F16D 1/0847 403/362 |
| 894,884 A | * | 8/1908 | Hallowell | F16D 1/0847 403/362 |
| 895,408 A | * | 8/1908 | Hallowell | F16D 1/0847 403/362 |
| 1,250,109 A | * | 12/1917 | Tepfer | F16D 1/0847 403/362 |

(Continued)

OTHER PUBLICATIONS

Amazon.com, "Climax Metal NC-100 Shaft Collar, Set Screw Style, One Piece, Nylon 1" Bore, 1-5/8" OD, 5/8" Width, With 5/16-18×5/16 Set Screw", Jun. 8, 2013 (see reviews) (Year: 2013).*

(Continued)

*Primary Examiner* — Magdalena Topolski
*Assistant Examiner* — Katelyn T Truong
(74) *Attorney, Agent, or Firm* — Amin, Turocy & Watson, LLP

(57) ABSTRACT

A pet chew dispensing device simultaneously secures and dispenses a pet chew. In some examples, the device may comprise a body of chew resistant material and a window formed through the body and adapted to receive the pet chew therein. When disposed inside the window, the pet chew remains partially exposed while the pet chew is simultaneously protected by the body of chew resistant material. The device adaptively pressures the pet chew, such that pet chews which change size over time (or having a range of different initial sizes) may nonetheless remain secured.

17 Claims, 10 Drawing Sheets

(56) References Cited

U.S. PATENT DOCUMENTS

| | | | | | |
|---|---|---|---|---|---|
| 1,264,594 | A | * | 4/1918 | Barry | F16D 1/0847 |
| | | | | | 403/362 |
| 1,555,847 | A | * | 10/1925 | Hudson | E04G 7/20 |
| | | | | | 403/306 |
| 2,163,315 | A | * | 6/1939 | Dalrymple | F16B 2/065 |
| | | | | | 403/344 |
| 2,739,830 | A | * | 3/1956 | Firth | F16B 2/065 |
| | | | | | 403/366 |
| 4,140,415 | A | * | 2/1979 | Koyamato | F16B 7/1472 |
| | | | | | 248/413 |
| 4,314,771 | A | * | 2/1982 | Lambert | F16B 7/0426 |
| | | | | | 16/429 |
| 5,024,303 | A | * | 6/1991 | Kosloff | E05C 17/30 |
| | | | | | 16/82 |
| 5,228,798 | A | * | 7/1993 | Tzanovici | E05B 1/0015 |
| | | | | | 292/350 |
| 5,580,184 | A | * | 12/1996 | Riccitelli | F16D 1/0864 |
| | | | | | 280/779 |
| 6,142,502 | A | * | 11/2000 | Breslin | B60D 1/155 |
| | | | | | 280/491.5 |
| 10,480,696 | B2 | * | 11/2019 | Leeth | E21B 17/046 |
| 2009/0217885 | A1 | * | 9/2009 | Peter | A01K 15/025 |
| | | | | | 119/709 |

OTHER PUBLICATIONS

U.S. Appl. No. 15/882,667, Inventor Suman Shrestha, filed Jan. 29, 2018.
Non-Final Office Action received for U.S. Appl. No. 15/882,667 dated Feb. 3, 2020, 37 pages.

* cited by examiner

US 10,701,900 B1

PET CHEW DISPENSING DEVICE

CROSS-REFERENCE TO RELATED APPLICATION

This is a continuation in part which claims priority under 35 U.S.C. § 120 of U.S. patent application Ser. No. 15/882,667, entitled "PET CHEW DISPENSING DEVICE", filed on Jan. 29, 2018, which is a nonprovisional claiming priority under 35 U.S.C. § 119 of U.S. Provisional Patent Application 62/537,626, entitled "PET CHEW DISPENSING DEVICE", filed on Jul. 27, 2017. The prior applications are incorporated herein by reference.

BACKGROUND

There are a variety of popular pet toy products available in pet supply stores. Pet "toys", such as balls, ropes, and rubber chew toys, are distinguished herein from pet "chews" such as bones, rawhides, bully sticks, and hardened cheeses. Pet toys are not designed for consumption, while pet chews are designed to be at least partially consumed. While chews made of relatively tough materials can withstand the stress of being chewed for some time, it is nonetheless desirable to extend the life of chews, particularly for certain pets. Furthermore, it may be desirable add interest to chews by making them more challenging and/or entertaining. In general, there is an ongoing need to increase the variety of both pet toy and pet chew products to meet the needs and preferences available to dog and other pet owners.

SUMMARY

A pet chew dispensing device is disclosed. The pet chew dispensing device may be adapted to simultaneously secure and dispense a pet chew. In some examples, the pet chew dispensing device may comprise a body of chew resistant material, and a window formed through the body and adapted to receive the pet chew therein. When disposed inside the window, opposite faces of the pet chew remain exposed while a perimeter of the pet chew is protected by the body of chew resistant material. Opposite edges of the window may comprise opposing means to secure the pet chew inside the window. At least one of the opposing means to secure the pet chew may include a means to adaptively pressure the pet chew, such that pet chews having a range of different sizes may nonetheless be pressed against the opposite means to secure the pet chew. Further aspects of the invention are shown in the attached pictures and described below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Figure 1:
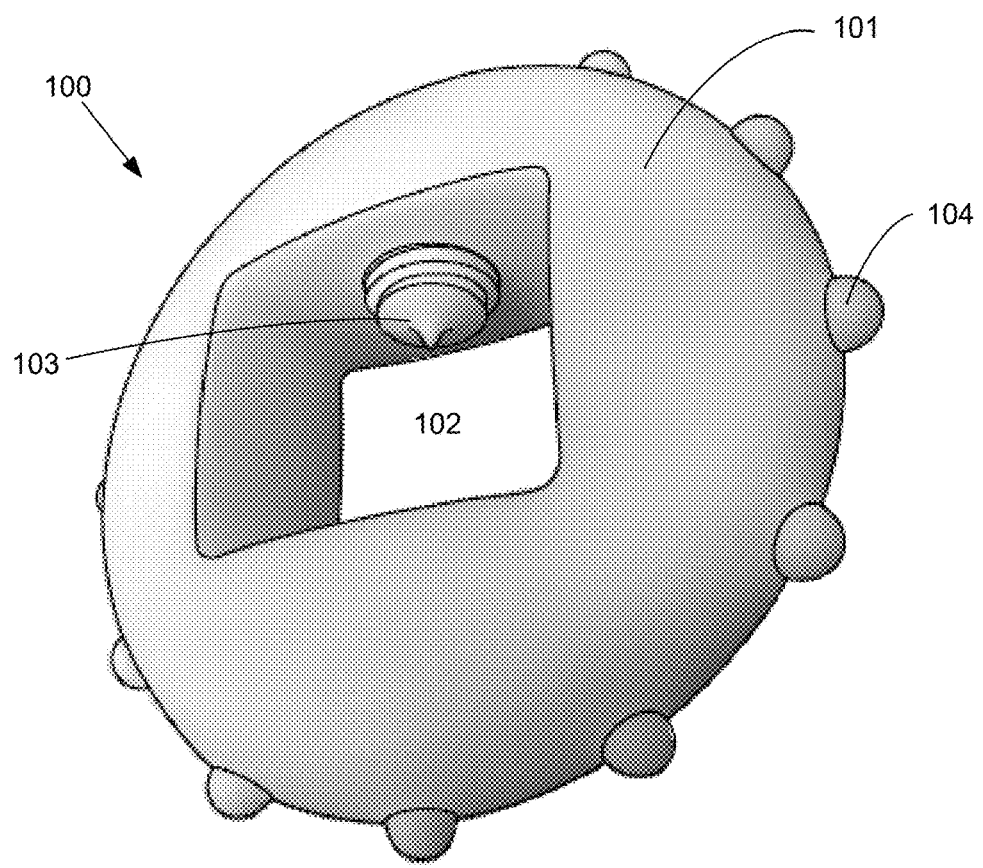
FIG. 1 is a first perspective view of an example large pet chew dispensing device.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

FIG. 1 is a first perspective view of an example large pet chew dispensing device 100, in accordance with some embodiments of the present disclosure. The pet chew dispensing device 100 is adapted to secure and dispense a pet chew, e.g., the pet chew 301 illustrated in FIG. 3. Pet chew 301 may comprise, e.g., a block of hardened cheese, bone, rawhide, bully stick, combinations thereof, or any of a variety of other tough chewable materials suitable for pet consumption, as will be appreciated.

With reference to FIG. 1, the pet chew dispensing device 100 includes a body 101 of chew resistant material and a window 102 formed through said body 101, wherein the window 102 is adapted to receive the pet chew 301 therein. When disposed inside the window 102, opposite faces of the pet chew 301 remain at least partially exposed while a perimeter of the pet chew 301 is substantially protected by the body 101 of chew resistant material. In other optional embodiments, the body 101 may comprise additional structures extending therefrom and/or partially securing and/or covering exposed faces of pet chew 301.

Figure 2:
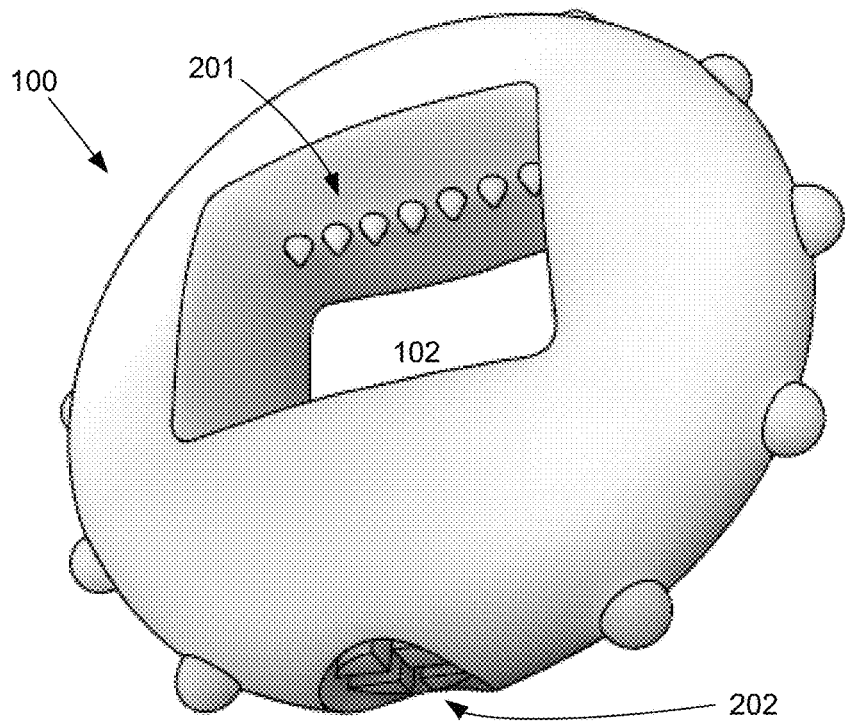
FIG. 2 is a second perspective view thereof.

FIG. 2 is a second perspective view of the example large pet chew dispensing device 100. FIG. 2 illustrates a plurality of teeth 201 disposed along at least a first edge of the window 102. Teeth 201 comprise one example means to secure a first side of the perimeter of the pet chew 301 at a first edge of the window 102. A variety of other means to secure the pet chew 301 may be used in place of teeth in some embodiments, as will be appreciated. Also, in some embodiments, teeth 201 or other means to secure the pet chew 301 may optionally be disposed along additional edges of the window 102, in addition to the first edge thereof.

Referring back to FIG. 1, a pointed screw tip 103 is illustrated as an example means to secure a second side of the perimeter of the pet chew 301 at a second edge of the window 102. The second side of the pet chew 301 and the second edge of the window 102, that is, the vicinity of the pointed screw tip 103, is opposite the first side of the pet chew 301 and the first edge of the window 102, that is, the vicinity of the pointed teeth 201.

At least one of the means to secure a side of the perimeter of the pet chew 301, e.g., the pointed screw tip 103, may comprise a means to adaptively pressure to the pet chew 301. In general, the means to adaptively pressure the pet chew may adapt to a range of pet chew sizes, and may press the pet chew 301 against the opposing means to secure the perimeter of the pet chew 301. For example, in the illustrated embodiment, the pointed screw tip 103 is backed by a threaded screw. The screw is disposed inside a threaded hole extending from a perimeter of the body 101 of chew resistant material, through a portion of the body 101 of chew resistant material, and into the window 102.

In the illustrated embodiment, the screw provides the means to adaptively pressure the pet chew 301, because the screw can be advanced and retreated to adapt to a range of pet chew sizes, and the screw presses the pet chew 301 against the teeth 201 to secure the perimeter of the pet chew 301. Screw tip 103 and the attached screw comprise one example means to secure a side of the pet chew 301, and one example means to adaptively pressure the pet chew 301, respectively. A variety of other means to secure the pet chew 301 and/or adaptively pressure the pet chew 301 may be used in place of the screw tip 103 and screw in some embodiments, as will be appreciated.

Some embodiments may comprise one "adaptive" means to secure the pet chew 301, such as screw tip 103 which comprises means to adaptively pressure the pet chew 301, and one "passive" means to secure the pet chew 301, such as teeth 201, which are stationary and unadaptable. Other embodiments may comprise multiple "adaptive" means, or only "adaptive" means, or multiple "adaptive" means and multiple "passive" means, along different sides of the window 102.

In some embodiments, the body 101 of chew resistant material may comprise, e.g., nylon, hard rubber, hard plastic, bone, wood, metal, or other hard material. In some embodiments, the chew resistant material may generally be harder than a chew 301 inserted in the window 102, but softer than pet's teeth to avoid dental damage. The body 101 of chew resistant material may be solid, or may be hollow inside.

In FIG. 1, the example body 101 is disc shaped, with a round outer perimeter, a front side and a back side. The body 101 has a middle thickness which tapers toward the outer perimeter. A plurality of protruding knobs 104 are spaced at intervals as shown. The window 102 is rectangular (square) and formed in the middle of the body 101. Of course, other shapes and configurations for body 101 may be made with the benefit of this disclosure. In some embodiments, the body 101 may be, e.g., about 3-5 inches in diameter, and about 0.75-1.5 inches thick at the window 102. The window 102 may be about 0.75-1.5 inches in length, height and thickness (depth). Other body shapes and sizes may be suitable for different embodiments. For example, rectangular or star shaped body 101 perimeters, or elliptical or circular windows 102 may be made for some embodiments. Furthermore, additional structures may extend from body 101 in some embodiments.

In some embodiments, the teeth 201 may be molded as part of the body 101, so that body 101 and teeth 201 are made from a single piece of the same material, as shown. The teeth 201 may generally be small, pointed cones several millimeters (1-4) in height, which will bite into a pet chew 301 inserted into the window 102. In FIG. 2, there are seven teeth disposed along one edge of the window 102, and the teeth 201 are all in a single line, across a middle of the window edge surface, extending between opposite sides of the window 102. More or fewer teeth 201 may be used and the teeth 201 may be arranged differently in other embodiments. For example, teeth 201 may be arranged in two or more lines, or in a zigzag or other pattern, or in staggered lines in other embodiments. In some embodiments, additional teeth 201 may be formed along additional window edges.

FIG. 1 illustrates a distal end of the screw comprising screw tip 103, and FIG. 2 illustrates the proximal end of the screw. The screw is disposed in a threaded hole which extends through the body 101. The threaded hole extends from an outer surface of the body 101, through the body 101, and into the window 102, entering the window 102 opposite the teeth 201 as shown.

In some embodiments, the screw may be made of a same material as the body 101. Like the body 101 itself, the screw may be solid or hollow. The screw comprises a screw diameter that substantially matches a diameter of the threaded hole, in order to form a friction fit inside the threaded hole. In some embodiments, the screw diameter may be, e.g., about ¼-¾ the center thickness of the body 101 (0.1875-1.5 inches). In some embodiments, the screw diameter may be, e.g., up to 2 centimeters. In some embodiments, the screw may have a diameter of at least 0.1875 inches. The screw may be generally of wide diameter, as shown, in order to generate appropriate friction force, preventing the screw from releasing, while simultaneously being easy to turn using hand tools.

The screw may generally be of a length such that when the proximal end of the screw is at the outer surface of the body 101, the pointed tip 103 protrudes up to 1-2 centimeters into the window 102, as shown. For example, the screw may be 2-5 centimeters in length in some embodiments. The pointed tip 103 may have a unique shape as shown, with the pointed tip in the middle of the screw, and a comparatively wide, flat skirt surrounding the pointed tip.

The screw may comprise a tool interface 202 at the proximal end thereof, e.g., one or more screwdriver grooves as shown. The screw may be tightened by applying a twisting force at the tool interface 202. The tool interface 202 may be in a flat head or Phillip's head arrangement. In some embodiments, the grooves of the tool interface 202 may be up to 3-4 millimeters in width, and may extend across the full diameter of the proximal end of the screw, allowing for the use of a coin or other implement to tighten the screw.

Figure 3:
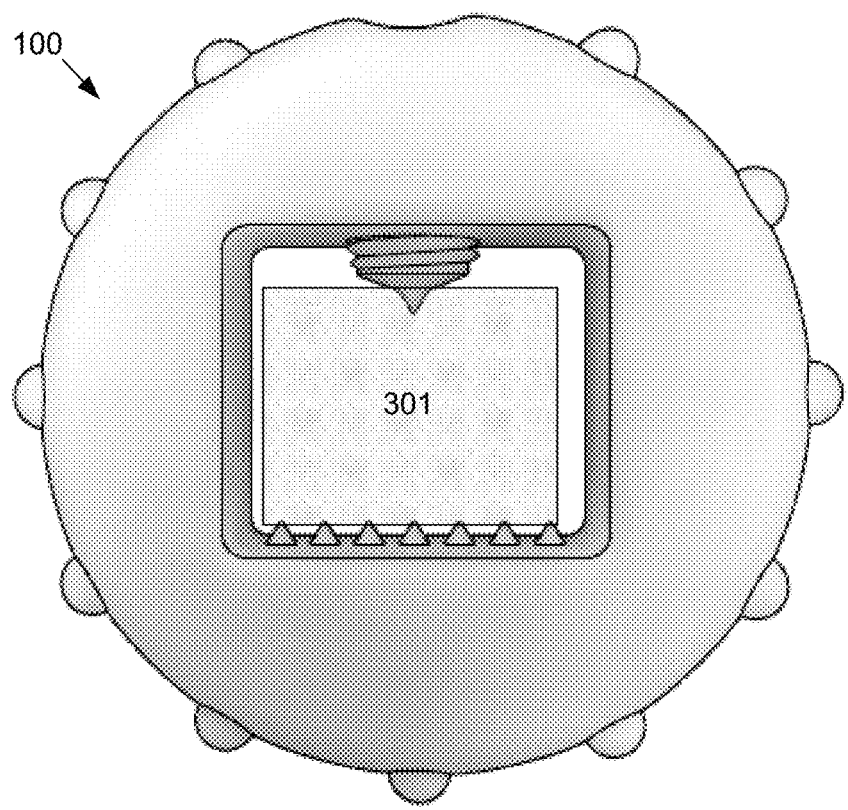
FIG. 3 is a front plan view thereof, the back being a mirror image.

FIG. 3 illustrates a front plan view of the pet chew dispensing device 100, the back being a mirror image. The pet chew dispensing device 100 may receive a pet chew 301, e.g., a rectangular block of hardened cheese or other chew, in the window 102, and the screw may be tightened to hold the pet chew 201 securely between the teeth 201 and the screw tip 103. If the chew 301 becomes loose inside the window 102, the screw may be tightened further. The pet chew dispensing device 100 extends the life of the chew 301 while adding challenge and interest for the pet.

Figure 4:
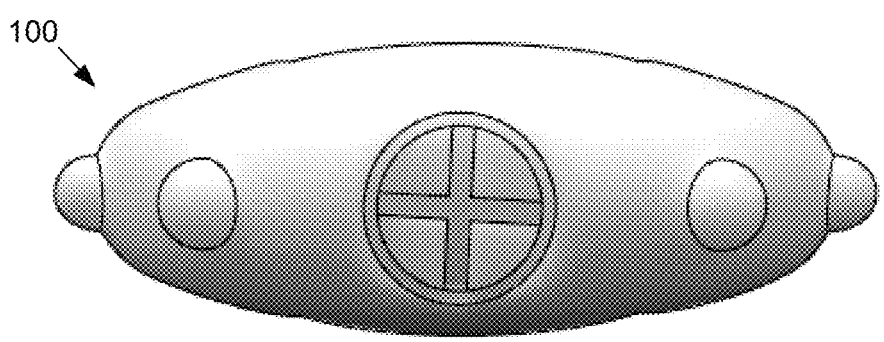
FIG. 4 is a top elevation view thereof.
Figure 5:
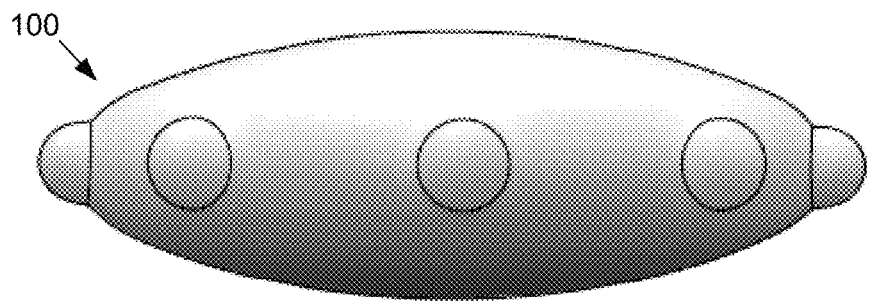
FIG. 5 is a bottom elevation view thereof.
Figure 6:
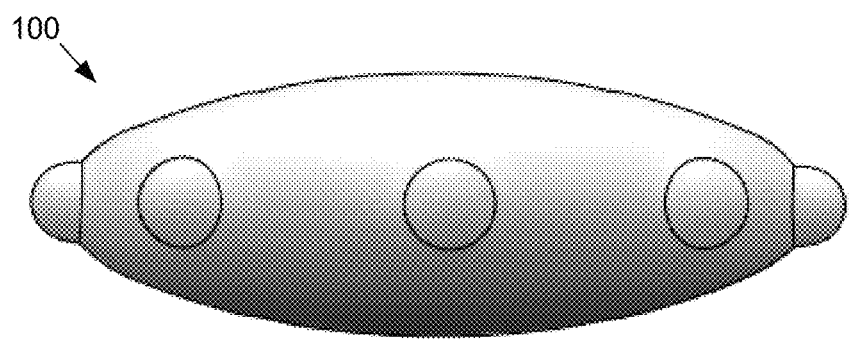
FIG. 6 is a right side elevation view thereof, the left side being a mirror image.

FIGS. 4, 5, and 6 provide additional views of the example pet chew dispensing device 100. FIG. 4 is a top elevation view thereof; FIG. 5 is a bottom elevation view thereof; and FIG. 6 is a right side elevation view thereof, the left side being a mirror image.

Figure 7:
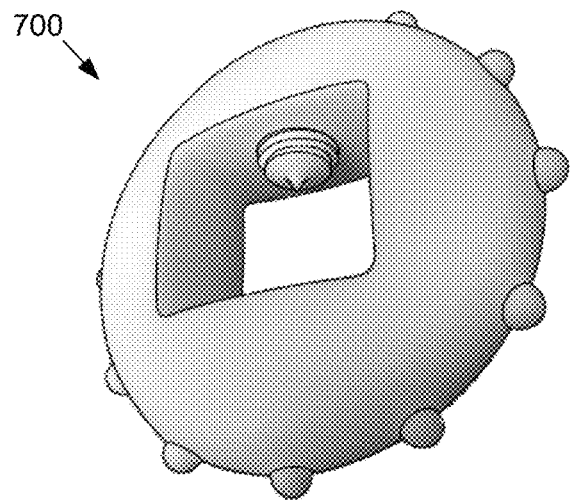
FIG. 7 is a first perspective view of an example small pet chew dispensing device.
Figure 8:
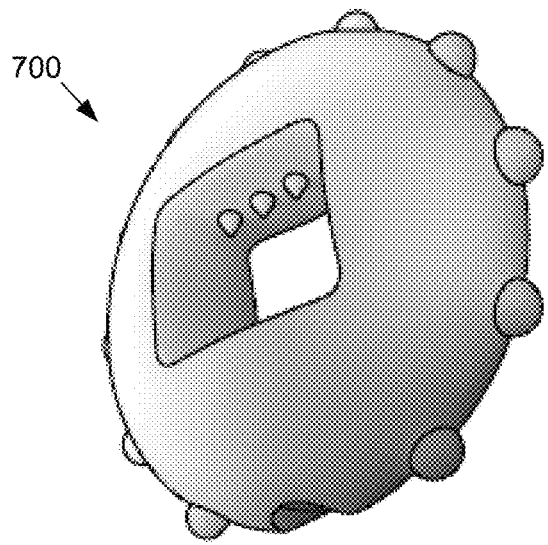
FIG. 8 is a second perspective view thereof.
Figure 9:
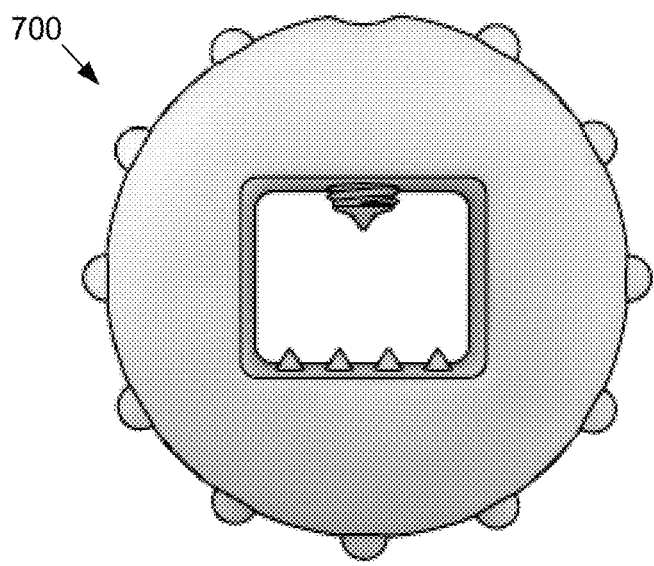
FIG. 9 is a front plan view thereof, the back being a mirror image.
Figure 10:
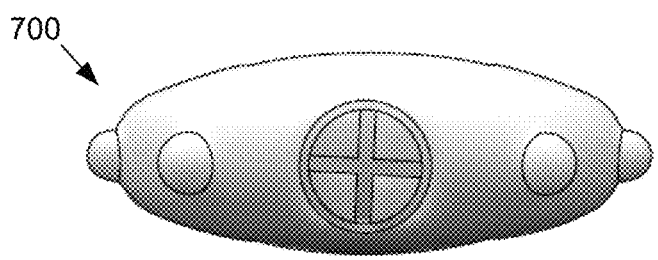
FIG. 10 is a top elevation view thereof.
Figure 11:
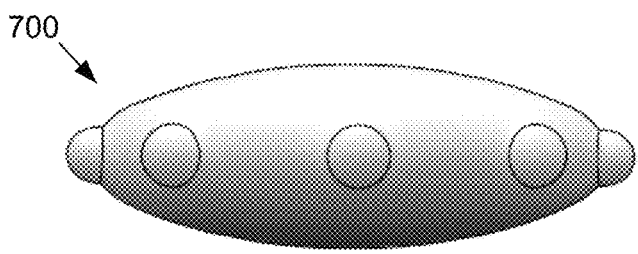
FIG. 11 is a bottom elevation view thereof.
Figure 12:
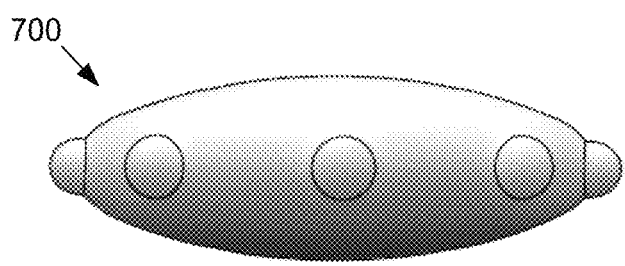
FIG. 12 is a right side elevation view thereof, the left side being a mirror image.

FIGS. 7, 8, 9, 10, 11, and 12 illustrate and example small sized pet chew dispensing device 700, in accordance with at least some embodiments of the present disclosure. The smaller sized pet chew dispensing device 700 may generally be similar to the larger pet chew dispensing device 100, described herein. The smaller sized pet chew dispensing device 700 may be, e.g., about 50%-80% of the size of the pet chew dispensing device 100. FIG. 7 is a first perspective view of the example small pet chew dispensing device 700; FIG. 8 is a second perspective view thereof; FIG. 9 is a front plan view thereof, the back being a mirror image; FIG. 10 is a top elevation view thereof; FIG. 11 is a bottom elevation view thereof; and FIG. 12 is a right side elevation view thereof, the left side being a mirror image.

Figure 13:
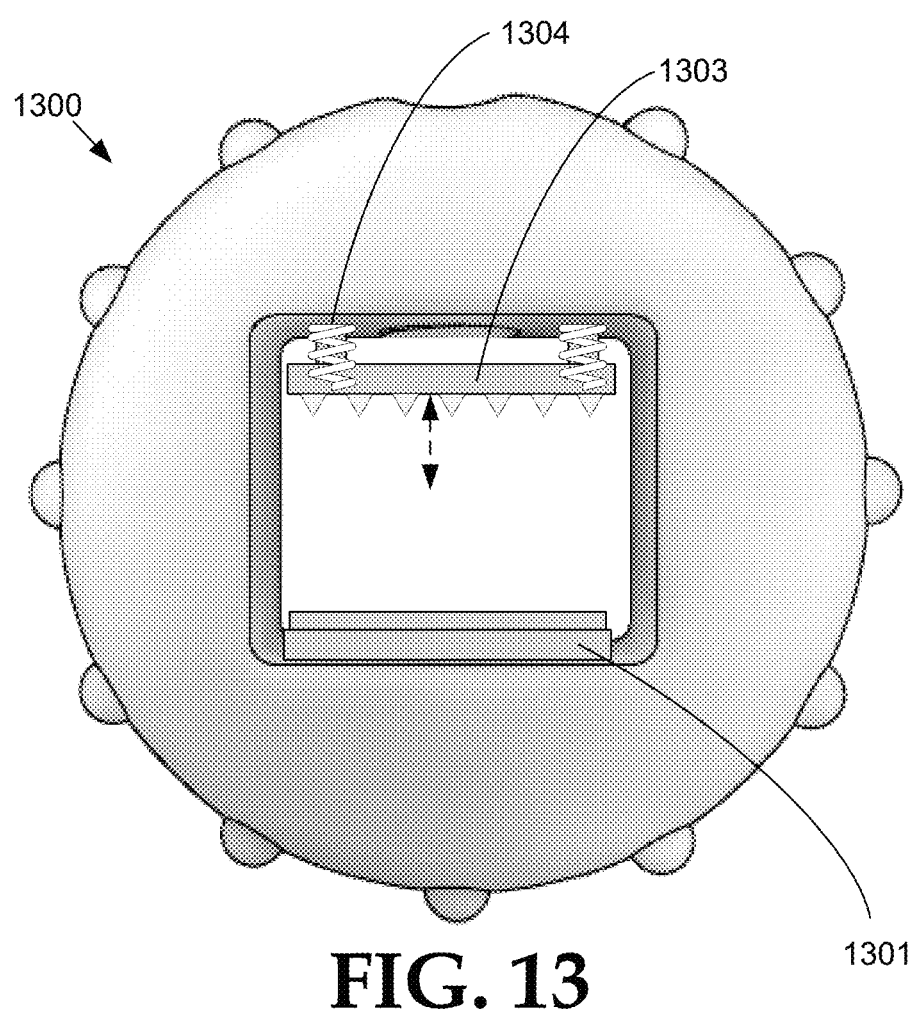
FIG. 13 is a front plan view of an example pet chew dispensing device comprising example alternative means to secure the pet chew therein.

FIG. 13 is a front plan view of an example pet chew dispensing device 1300 comprising example alternative means to secure the pet chew 301 therein. In FIG. 13, a set of two channel walls 1301 provide means to secure a first side of the perimeter of the pet chew 301 at a first edge of the window. One end of the pet chew 301 may be inserted in the channel formed between the channel walls 1301. Furthermore, a moving plate 1303 with teeth provide the means to secure a second side of the perimeter of the pet chew at a second edge of the window. The moving plate 1303 is mounted on springs 1304 between the plate 1303 and the body 101. The springs 1304 provide the means to adaptively pressure to the pet chew 301 by adapting to a range of pet chew sizes and pressing the pet chew 301 against the channel formed by channel walls 1301. FIG. 13 illustrates example modifications to the securing means and adaptive pressuring means illustrated in FIG. 1. It will be appreciated that the various securing means and adaptive pressure means disclosed herein may be interchanged, modified, or supplemented in some embodiments.

Figure 14:
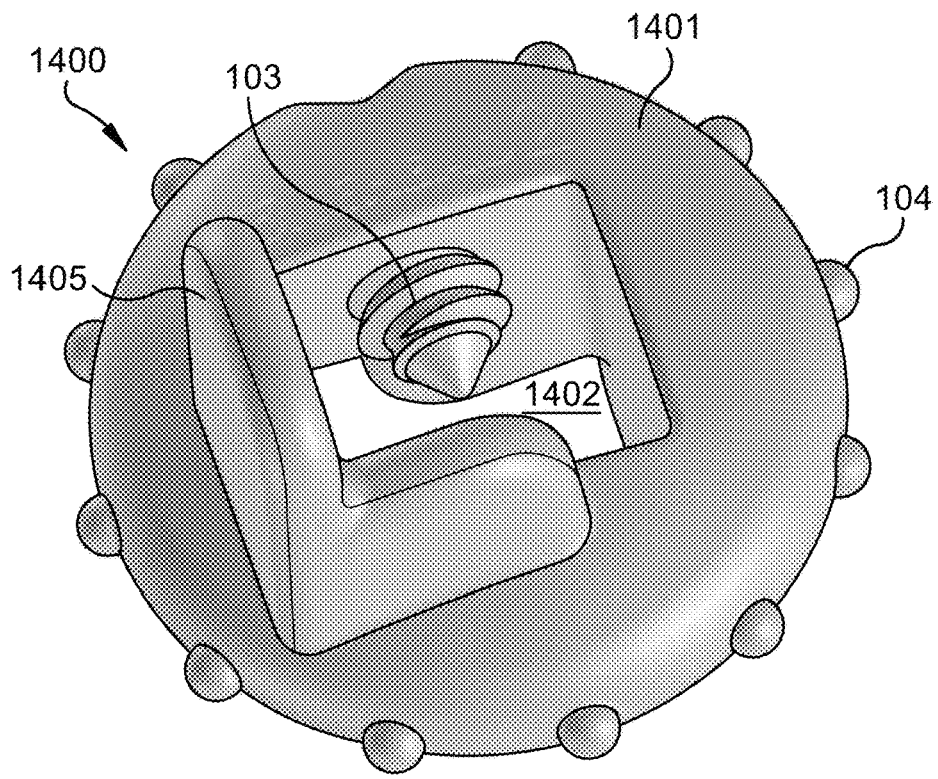
FIG. 14 is a first perspective view of an example large pet chew dispensing device including brace walls.
Figure 15:
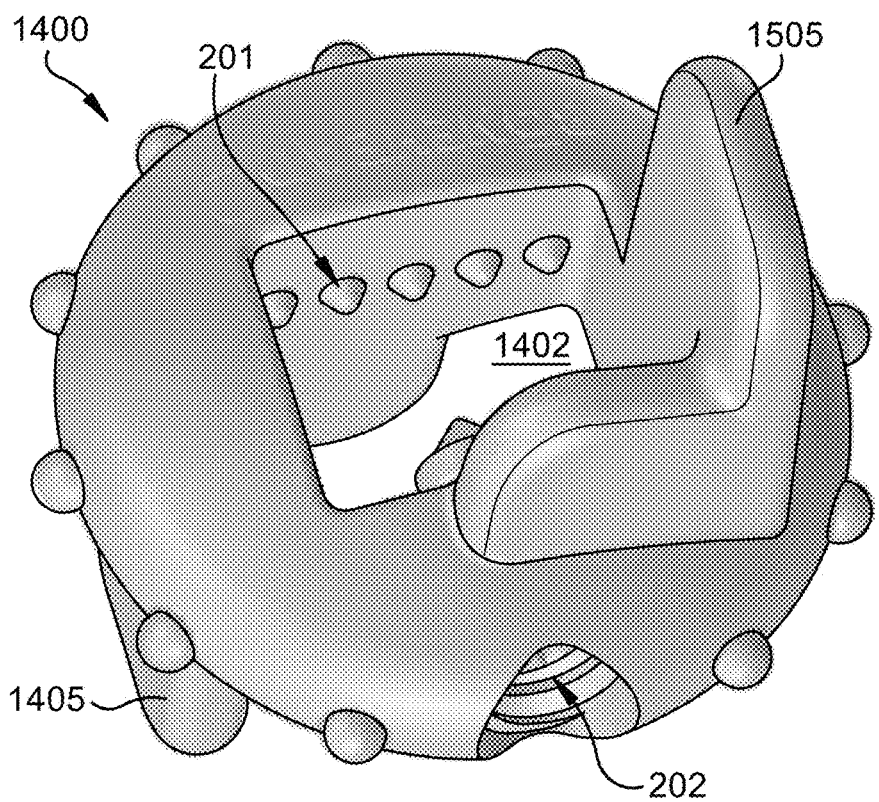
FIG. 15 is a second perspective view thereof.
Figure 16:
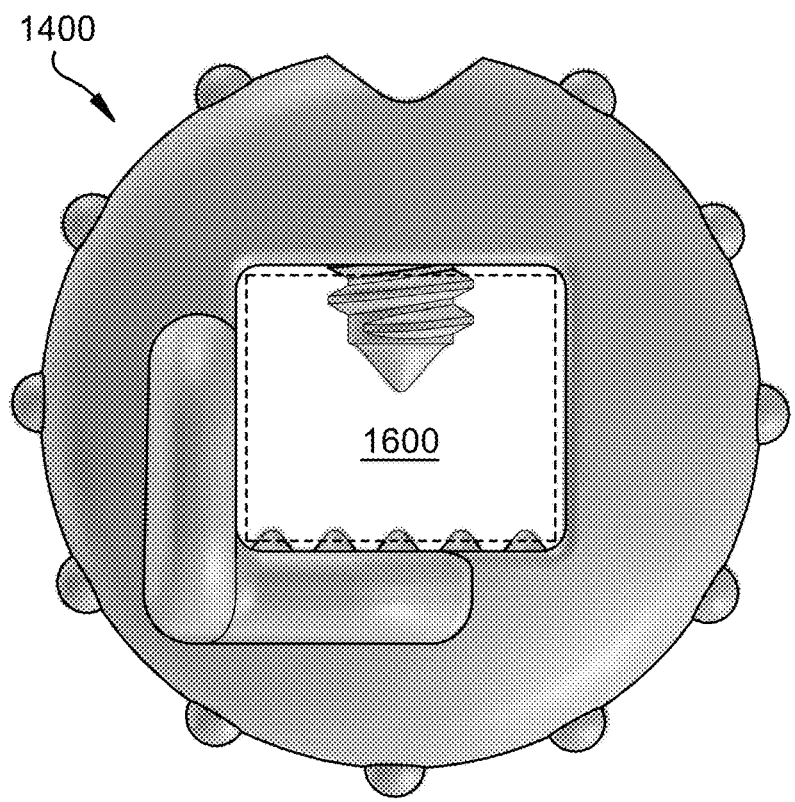
FIG. 16 is a front plan view thereof.
Figure 17:
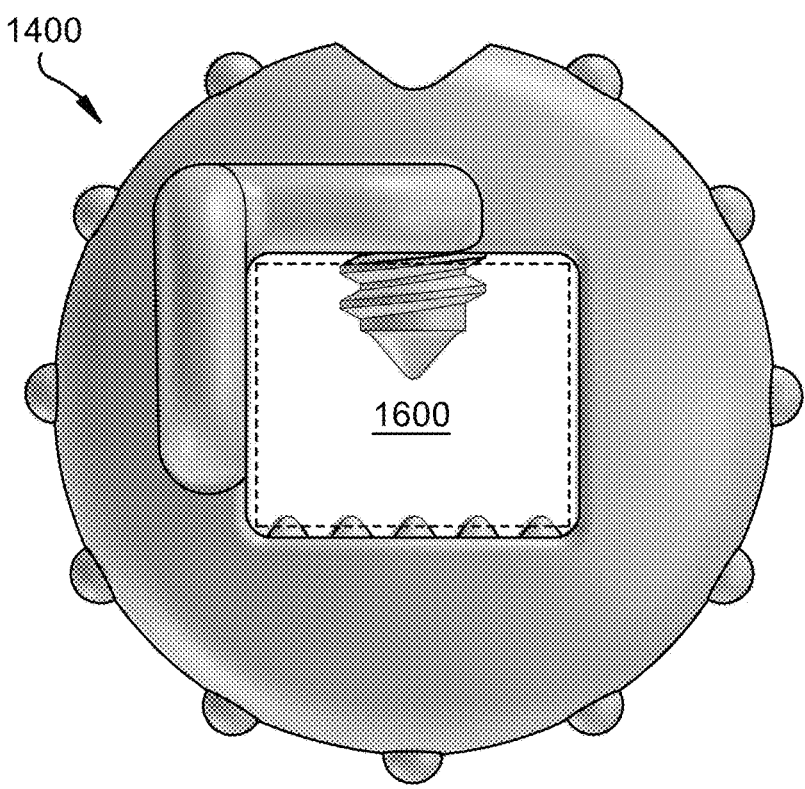
FIG. 17 is a back plan view thereof.
Figure 19:
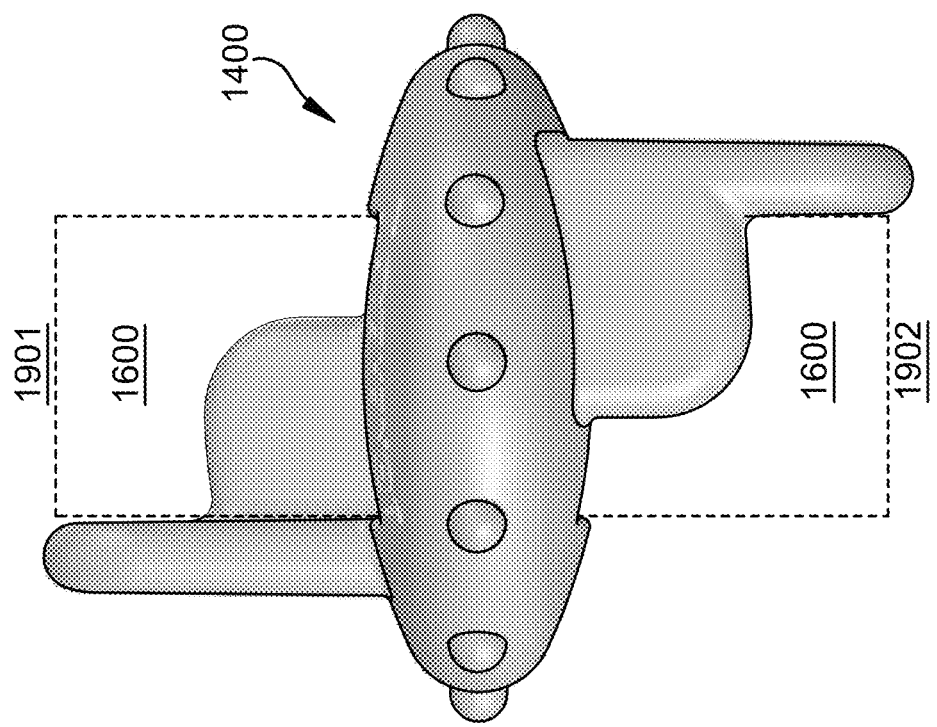
FIG. 19 is a bottom elevation view thereof.
Figure 18:
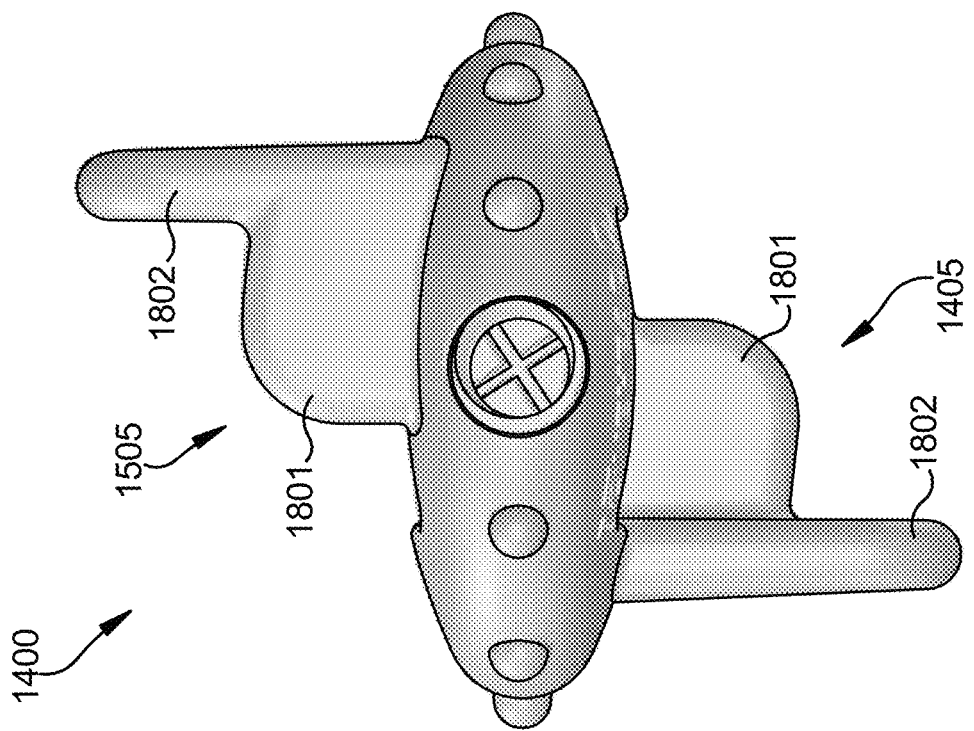
FIG. 18 is a top elevation view thereof.
Figure 20:
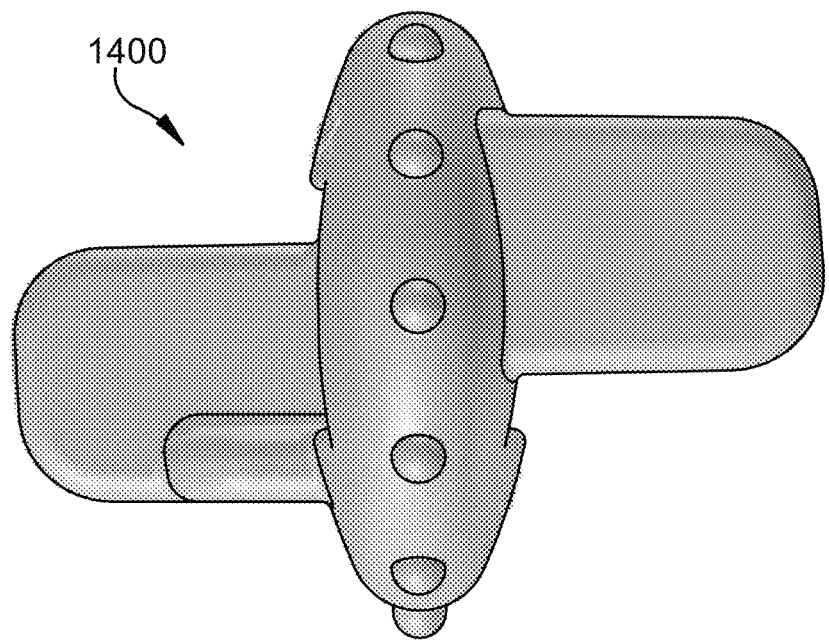
FIG. 20 is a right side elevation view thereof.
Figure 21:
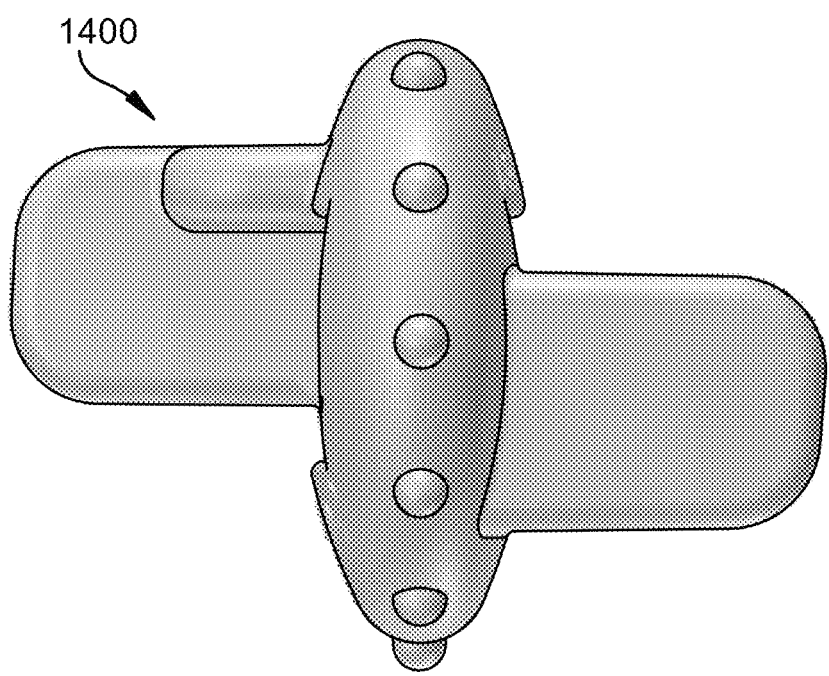
FIG. 21 is a left side elevation view thereof.

FIGS. 14, 15, 16, 17, 18, 19, 20 and 21 illustrate an example large pet chew dispensing device 1400 including brace walls, in accordance with at least some embodiments of the present disclosure. FIGS. 14 and 15 provide perspective views of pet chew dispensing device 1400. FIGS. 16 and 17 provide front and back plan views thereof, respectively, FIGS. 18 and 19 provide top and bottom elevation views thereof, respectively, and FIGS. 20 and 21 provide right side and left side elevation views thereof, respectively.

Pet chew dispensing device 1400 may generally comprise many of the features described herein in connection with pet chew dispensing device 100, as will be appreciated from the drawings, and like elements in the drawings are given like identifiers. Furthermore, pet chew dispensing device 1400 may generally comprise similar dimensions and materials described herein in connection with pet chew dispensing device 100.

The pet chew dispensing device 1400 includes a body 1401 of chew resistant material and a window 1402 formed through said body 1401, wherein the window 1402 is adapted to receive a pet chew 1600 therein (see FIGS. 16, 17, and 19). When disposed inside the window 1402, opposite faces of the pet chew 1600 may remain at least partially exposed while at least a portion of a perimeter of the pet chew 1600 may be protected by the body 1401 of chew resistant material. Furthermore, at least one brace wall, such as brace wall 1405 and/or brace wall 1505, may protrude from the body 1401 of chew resistant material. The brace walls 1405 and 1505 may be coplanar with window 1402 edges and brace walls 1405 and 1505 may thereby adapted to brace the pet chew 1600 in the window 1402, as well as to provide additional protection for the pet chew 1600.

In the illustrated embodiment, the pet chew dispensing device 1400 comprises two brace walls 1405 and 1505 protruding from opposite sides of the body 1401 of chew resistant material. Each of the brace walls 1405 and 1505 is positioned at a corner of the window 1402, and the brace walls 1405 and 1505 are furthermore positioned at diagonally opposite corners of the window 1402. Brace walls 1405 and 1505 "wrap" around window 1402 corners, with each brace wall 1405 and 1505 comprising a first portion 1801 coplanar with a first window edge, and a second portion 1802 coplanar with a second window edge. For example, FIG. 18 illustrates brace wall 1405 comprising a first portion 1801 coplanar with a first window edge (the bottom window edge as seen in FIG. 16), and a second portion 1802 coplanar with a second window edge (the right window edge as seen in FIG. 16). Brace wall 1505 similarly comprises first and second portions 1801 and 1802, which are coplanar with the top and left window edges seen in FIG. 16, respectively. Furthermore, the first and second portions 1801, 1802 of the brace walls 1405 and 1505 may have different heights. In the illustrated embodiment, the first portions 1801 (coplanar with the top and bottom window edges) have a shorter height which is approximately half the height of the second portions 1802 (coplanar with the right and left window edges).

In the illustrated embodiment, e.g., in FIGS. 16, 17, and 19, opposite (front and back) faces 1901, 1902 of chew 1600 are completely exposed because front and back faces 1901, 1902 are not braced or covered by any portion of body 1401. In alternative embodiments, it will be appreciated that one or more structures of body 1401 may partially extend over portions of front and back faces 1901, 1902. For example, second portions 1802 of brace walls 1405 or 1505, illustrated in FIG. 18, may be shaped to include lateral members extending at least partially across front and back faces 1901, 1902 of chew 1600. Body 1401 may furthermore comprise additional structures extending therefrom and/or partially securing and/or covering exposed faces of pet chew 1600.

In the illustrated embodiment, a center portion of the perimeter of the pet chew 1600 is protected by the body 1401 of chew resistant material. The perimeter of pet chew 1600 may include, e.g., the top, bottom, left and right faces thereof. As will be understood with reference to FIG. 19, the central disk of body 1401 protects the central portion of the perimeter of pet chew 1600 covered thereby. Brace walls 1405 and 1505 additionally protect the right and left faces of the pet chew 1600, and portions of the top and bottom faces of the pet chew 1600. In some embodiments, additional brace walls may be included to protect more of the perimeter of pet chew 1600, or brace walls 1405 and 1505 may be differently configured to protect more or less of the pet chew 1600.

In addition to protecting portions of pet chew 1600, brace walls 1405 and 1505 brace the pet chew 1600 in the window 1402. In the illustrated embodiment, brace walls 1405 and 1505 may be coplanar with window edges, preventing motion of the pet chew 1600 relative to the pet chew dispensing device 1400. While coplanar brace walls are well suited to pet chews which are rectangular or otherwise include planar faces (such as pet chew 1600), differently shaped pet chews may be accommodated by differently shaped, even nonplanar and/or non-coplanar brace walls, as will be appreciated. In general, brace walls 1405 and 1505 may be adapted to extend from body 1401 and contact the perimeter of pet chew 1600 in order to brace the pet chew 1600 in the pet chew dispensing device 1400. Furthermore, in some embodiments, one or more of brace walls 1405 and 1505 may be at a slight inward angle in order to firmly secure a rectangular pet chew 1600 in the pet chew dispensing device 1400—such slightly angled embodiments are considered as substantially coplanar as the term is used herein.

Those of skill in the art will appreciate that numerous other variations of brace walls 1405, 1505 are possible. In some embodiments, brace walls 1405, 1505 may surround the entire window 1402. In some embodiments, brace walls 1405, 1505 may extend from each corner of window 1402, while optionally leaving one or more gaps between corner walls. In some embodiments, brace walls 1405, 1505 may extend from one or more sides of window 1402 without wrapping around the corners. Furthermore, numerous height variations are possible. In some embodiments, brace walls 1405, 1505 may be of uniform height or may have different sections of different heights as illustrated. These and other variations are within the spirit and scope of the invention as will be appreciated.

Figure 22:
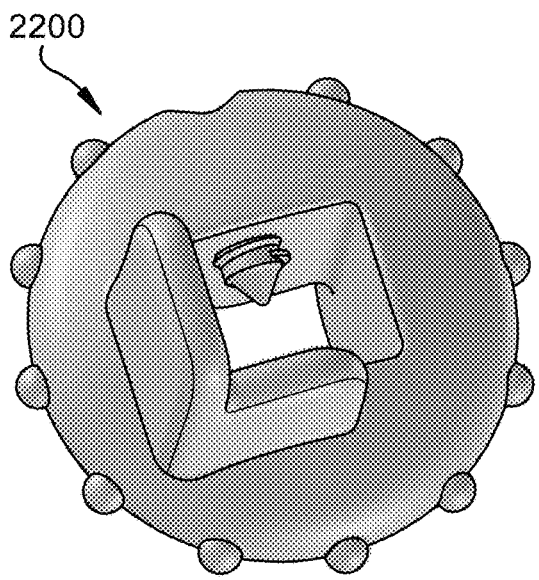
FIG. 22 is a first perspective view of an example small pet chew dispensing device including brace walls.
Figure 23:
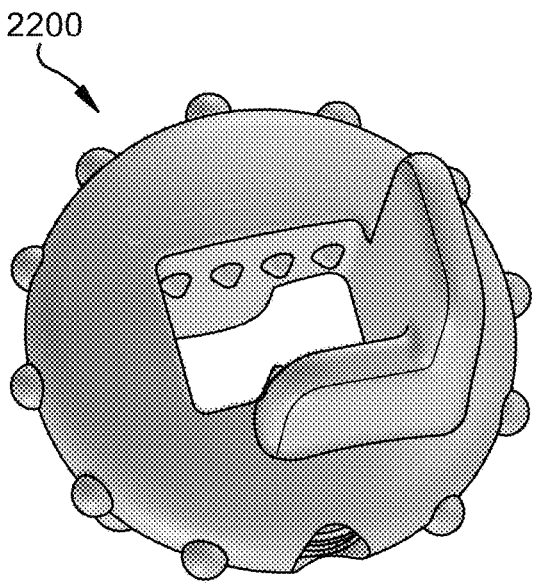
FIG. 23 is a second perspective view thereof.
Figure 24:
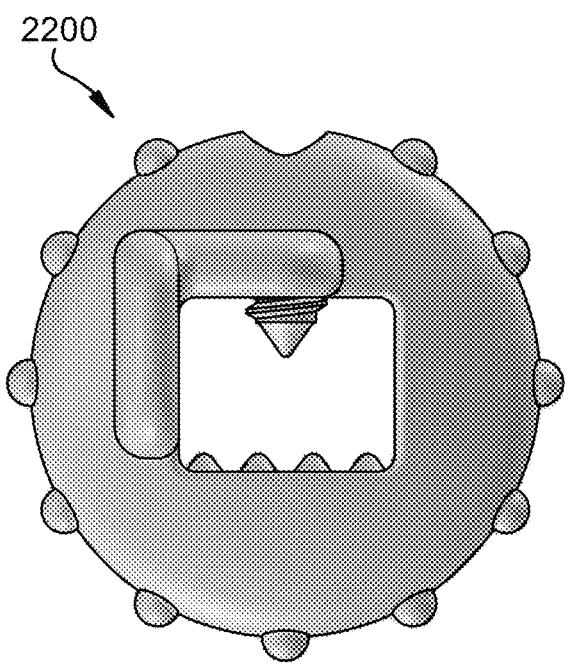
FIG. 24 is a front plan view thereof.
Figure 25:
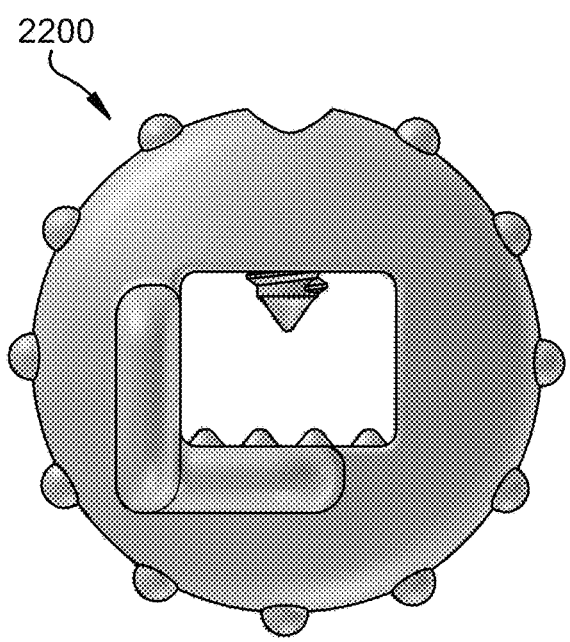
FIG. 25 is a back plan view thereof.

FIGS. 22, 23, 24, and 25 illustrate and example small sized pet chew dispensing device 2200 including brace walls, in accordance with at least some embodiments of the present disclosure. The smaller sized pet chew dispensing device 2200 may generally be similar to the larger pet chew dispensing device 1400, described herein. The smaller sized pet chew dispensing device 2200 may be, e.g., about 50%-80% of the size of the pet chew dispensing device 1400. FIGS. 22 and 23 provide first and second perspective views of the example small pet chew dispensing device 2200 including brace walls, and FIGS. 24 and 25 provide front and back plan views thereof, respectively. The top and side views of the example small pet chew dispensing device 2200 are substantially identical to those views of the larger pet chew dispensing device 1400.

While various embodiments have been disclosed herein, other aspects and embodiments will be apparent to those skilled in art.

The invention claimed is:

1. A pet chew dispensing device to secure and dispense a pet chew, comprising:
    a body of chew resistant material;
    a window formed through said body of chew resistant material, wherein the window receives the pet chew therein, and wherein, when disposed inside the window, opposite faces of the pet chew remain at least partially exposed while at least a portion of a perimeter of the pet chew is protected by the body of chew resistant material; and
    at least one brace wall protruding from the body of chew resistant material, wherein the brace wall is coplanar with a window edge and is thereby adapted to brace the pet chew in the window.

2. The pet chew dispensing device of claim 1, wherein the pet chew dispensing device comprises two brace walls protruding from opposite sides of the body of chew resistant material.

3. The pet chew dispensing device of claim 1, further comprising at least one means to adaptively pressure the pet chew within the window, wherein the at least one means to adaptively pressure the pet chew adapts to a range of pet chew sizes and applies pressure against at least one side of the perimeter of the pet chew.

4. The pet chew dispensing device of claim 1, wherein the body of chew resistant material is disc shaped.

5. The pet chew dispensing device of claim 1, wherein the body of chew resistant material has a middle thickness which tapers toward an outer perimeter of the body of chew resistant material.

6. The pet chew dispensing device of claim 1, wherein the window is rectangular.

7. The pet chew dispensing device of claim 1, wherein the window is formed in a middle of the body of chew resistant material.

8. The pet chew dispensing device of claim 1, wherein the body of chew resistant material comprises nylon.

9. The pet chew dispensing device of claim 1, wherein the at least one brace wall is positioned at a corner of the window, and wherein the at least one brace wall comprises a first portion coplanar with a first window edge, and a second portion coplanar with a second window edge.

10. The pet chew dispensing device of claim 9, wherein the first and second portions of the at least one brace wall have different heights.

11. The pet chew dispensing device of claim 1, further comprising a means to secure a first side of the perimeter of the pet chew at a first edge of the window.

12. The pet chew dispensing device of claim 11, wherein the means to secure the first side of the perimeter of the pet chew at the first edge of the window comprises one or more teeth disposed along the first edge of the window.

13. The pet chew dispensing device of claim 11, further comprising a means to secure a second side of the perimeter of the pet chew at a second edge of the window, wherein the second side of the perimeter of the pet chew and the second edge of the window, respectively, are opposite the first side of the perimeter of the pet chew and the first edge of the window, respectively.

14. The pet chew dispensing device of claim 13, wherein the means to secure the second side of the perimeter of the pet chew comprises a means to adaptively pressure the pet chew, wherein the means to adaptively pressure the pet chew adapts to a range of pet chew sizes and presses the pet chew against the means to secure the first side of the perimeter of the pet chew.

15. The pet chew dispensing device of claim 14, wherein the means to secure the second side of the perimeter of the pet chew at the second edge of the window comprises a pointed screw tip, and wherein the means to adaptively pressure the pet chew comprises a screw disposed inside a threaded hole extending from a perimeter of said body of chew resistant material, through a portion of the body of chew resistant material, and into the window.

16. The pet chew dispensing device of claim 15, wherein a screw diameter substantially matches a diameter of the threaded hole in order to form a friction fit inside the threaded hole.

17. The pet chew dispensing device of claim 15, wherein the screw has a diameter of at least 0.1875 inches and is made from a same chew resistant material as the body of chew resistant material.

* * * * *